United States Patent
Wang et al.

(10) Patent No.: US 9,973,721 B2
(45) Date of Patent: May 15, 2018

(54) PROCESSING METHOD AND APPARATUS FOR MISOPERATION, AND DISPLAY DEVICE

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Jianting Wang, Beijing (CN); Jianzi He, Beijing (CN); Junning Su, Beijing (CN); Xufeng Wang, Beijing (CN); Peng Cheng, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/099,243

(22) Filed: Apr. 14, 2016

(65) Prior Publication Data
US 2017/0041567 A1 Feb. 9, 2017
US 2017/0230602 A9 Aug. 10, 2017

(30) Foreign Application Priority Data
Aug. 4, 2015 (CN) .......................... 2015 1 0472357

(51) Int. Cl.
*H04N 5/44* (2011.01)
(52) U.S. Cl.
CPC ... *H04N 5/4403* (2013.01); *H04N 2005/4444* (2013.01)

(58) Field of Classification Search
CPC . H04N 2005/4412; H04N 2005/44517; H04N 21/4221
USPC ....... 348/725, 729, 739, 734, 731, 732, 553; 713/100
See application file for complete search history.

(56) References Cited

U.S. PATENT DOCUMENTS

2013/0166901 A1* 6/2013 Kim .................... G06F 9/44505
713/100

FOREIGN PATENT DOCUMENTS

| CN | 1606346 A | 4/2005 |
| CN | 101136999 A | 3/2008 |
| CN | 103686261 A | 3/2014 |
| CN | 104023267 A | 9/2014 |

OTHER PUBLICATIONS

China First Office Action, Application No. 201510472357.4, dated Aug. 9, 2017, 15 pps.: with English translation.

* cited by examiner

*Primary Examiner* — Michael Lee
*Assistant Examiner* — Jean W Desir
(74) *Attorney, Agent, or Firm* — Armstrong Teasdale LLP (57) ABSTRACT

A misoperation processing method includes determining, in response to triggering a misoperation cancellation step, display status information of a display device. The display status information is stored in a data storage area of the display device before the misoperation occurs. The method also includes restoring a display status of the display device that existed before the misoperation occurred based on the determined display status information.

17 Claims, 3 Drawing Sheets

In some embodiments, prior to not receiving the display image, the method further includes receiving an interrupt message to switch signal resources, evaluating whether there is a signal resource inputting an image, determining the format information of the image and displaying the image input by the signal resource in response to determining that the signal resource is inputting the image, and determining that display images are not being received in response to determining that the signal resource is not inputting the image.

In some embodiments, triggering the misoperation cancellation step may be triggered in response to receiving the display image, and receiving a user instruction of triggering the misoperation cancellation step.

In another embodiment, a misoperation processing apparatus includes a storage unit for pre-storing display status information of a display device in a data storage area before a misoperation occurs, and a judgment unit for judging whether to trigger a misoperation cancellation step. The misoperation processing apparatus further includes a determination unit for determining, in response to triggering the misoperation step, the display status information of the display device pre-stored in the data storage area of the display device, and a display unit for restoring the display status of the display device based on the display status information pre-stored in the data storage area.

In some embodiments, the misoperation processing apparatus allows for pre-storing the display status information of a display device in the data storage area before a misoperation occurs, and when a user triggers the misoperation cancellation, restoring the display status of the display device based on the display status information of the display device pre-stored in the data storage area of the display device. Thereby, the misoperation processing apparatus quickly cancels the misoperation and restores the display status of the display device that existed before the misoperation occurred during image display.

In some embodiments, the display status information of the display device includes the structure variable information of a display image on the display device.

In some embodiments, the structure variable information includes a path, channel and volume of the image.

In some embodiments, the display status information of the display device before the misoperation occurs is pre-stored in the data storage area of the display device in an inerasable data storage area in a stack.

In some embodiments, the determination unit for determining the display status information of a display device before the misoperation occurs determines the structure variable information of the display image based on an address pointer of the structure variable of the display image before the misoperation occurs.

In some embodiments, the judgment unit evaluates whether there is a signal resource inputting images when not receiving any display images, and if yes, then the image input by the signal resource is displayed; while if not, then the judgment unit evaluates whether to keep on waiting for the signal resource to input images. In response to determining to keep on waiting for the signal resource to input images, a standby state of NO SIGNAL is entered; while in response to determining not to wait for the signal resource to input images, the misoperation cancellation is triggered.

In some embodiments, the judgment unit outputs a prompt interface for users to choose whether to keep on waiting for the signal resource to input the image, and the judgement unit waits to receive a user instruction through the prompt interface. The waiting time for receiving the user instruction through the prompt interface is less than that for entering the standby state of NO SIGNAL.

In some embodiments, receiving the user instruction of entering the standby state of NO SIGNAL in the period of waiting for receiving the user instruction through the prompt interface causes the standby state of NO SIGNAL to be entered, otherwise, the misoperation cancellation is triggered.

In some embodiments, before the judgment unit is not receiving the display image, the apparatus receives an interrupt message to switch signal resources. The judgment unit evaluates whether there is a signal resource inputting an image and determines the format information of the image. If the signal resource is inputting an image, the image input by the signal resource is displayed, if not, then the judgement unit determines that display images are not being received.

In some embodiments, the judgment unit, when receiving the display image and the user instruction of triggering misoperation cancellation, triggers the misoperation cancellation.

In another embodiment, a display unit includes the misoperation processing apparatus according to the embodiments described herein.

DESCRIPTION OF EMBODIMENTS

To describe the present disclosure more clearly, the following detailed description references the accompanying drawings. The embodiments described herein are merely example embodiments, but not all of the embodiments. On the basis of the embodiments described herein, other embodiments may become apparent to persons of ordinary skill in the art without creative efforts, and such other embodiments will fall within the protection scope of the present disclosure.

It should be understood that the misoperation described herein may refer to the misoperation that occurs when remotely controlling the TV set, and includes, but is not limited to, mistakenly switching signal resources, incorrect switching of TV channels, mute by mistake, invoking a Home/Menu interface incorrectly, and so on. It should be understood that, besides the television controller, the misoperation processing method provided in the present disclosure may be applied to other types of misoperation.

Figure 1:
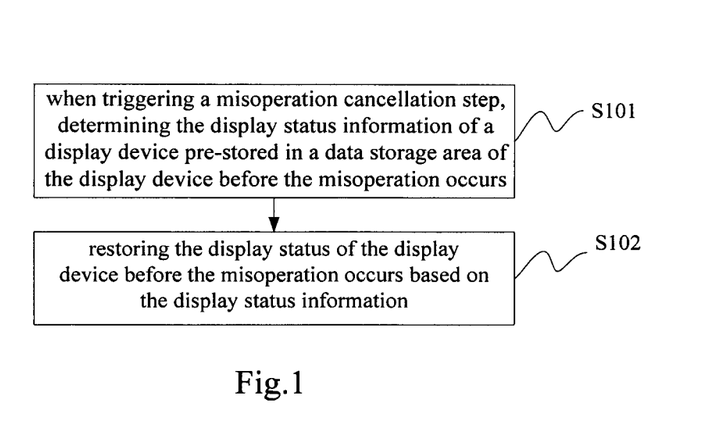
FIG. 1 is a flowchart showing a misoperation processing method according to one embodiment.

Referring to FIG. 1, a flow chart of an exemplary misoperation processing method is shown.

The method includes, in response to triggering a misoperation cancellation step, determining (S101) the display status information of a display device from a time before the misoperation occurred, wherein the display status information is stored in a data storage area of the display device.

The display status information of the display device includes structure variable information of a display image on the display device.

The triggering of misoperation cancellation step can be implemented by setting a cancel key on a remote controller. For example, the TV set receives a trigger message generated by the user pressing the cancel key upon a misoperation occurring.

It should be understood that, according to the embodiments described herein, the display status information of the display device may be stored in an inerasable data storage area in a system, so as to invoke the display status information from the data storage area when misoperation occurs. The display status information before the misoperation occurs, as used herein, refers to the display status information which is transmitted in the last one frame before the misoperation occurs, or the display status information which is transmitted in the last multiple frames. Specifically, the display device may be a TV set, and so on.

The method includes restoring (S102) the display status of the display device that existed before the misoperation based on the display status information determined in step S101.

In some embodiments, the structure variable information includes a path, channel and volume of the currently presented image.

According to the embodiments described herein, the channel may refer to, for example channel ID. The structure variable information of the display image, which is transmitted in the last one frame and/or the last multiple frames before the misoperation occurs and is pre-stored in the data storage area, is stored in an inerasable data storage area in a stack.

It should be understood that, according to the embodiments described herein, the display device is set up with the display status corresponding to the display status information which is transmitted in the last one frame before the misoperation occurs when it requires restoring the display status of the display device.

According to some embodiments described herein, the path, channel and volume of a currently displayed image is stored in the inerasable data storage area of the TV set before the misoperation occurs. Storing the information in the inerasable data storage area is for more accurately invoking data of the area and preventing being erased by new data.

Figure 2A:
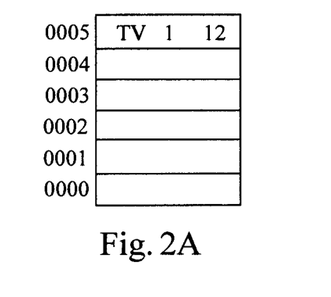
FIG. 2A is a schematic view showing a way of storing the structure variable information in a data storage area according to one embodiment.
Figure 2B:
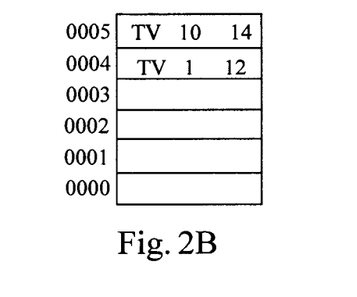
FIG. 2B is a schematic view showing a way of storing the structure variable information in a data storage area according to one embodiment.

For example, as shown in FIG. 2A, the path, channel ID and volume of the currently displayed image is TV, 1, 12 respectively. The path, channel ID and volume of the currently displayed image, which is TV, 1, 12 respectively, are pushed on stack in the inerasable data storage area and stored in the storage space referred by an address of 0005. As shown in FIG. 2B, if the user uses the remote controller to switch the channel, which is switched to TV path, channel ID of 10 and volume of 14, it requires pushing information of TV, 10, 14 on stack for storing. Before storing, information of TV, 1, 12 are stored in the storage space referred by the address of 0004 and information of TV, 10, 14 are stored in the storage space referred by the address of 0005.

In some embodiments, determining display status information of the display device pre-stored in a data storage area of the display device before the misoperation occurs includes determining the structure variable information of the current display image based on an address pointer of the structure variable of the display image before the misoperation occurs which is stored in the inerasable data storage area.

According to one embodiment, the structure variable information of the currently displayed image is stored in stack, and storage address pointers direct to each structure variable information are configured. When receiving a message that the remote controller has caused a switch, the structure variable information of a switched display image is stored on the top of the stack in the data storage area, and an address pointer of the top of the stack is determined as n. If the system identifies that the switch is triggered by the cancel key, the system automatically delivers the structure variable information within the storage area corresponding to the address pointer of n−1 from the stack and displays an image corresponding to the structure variable information.

Figure 3:
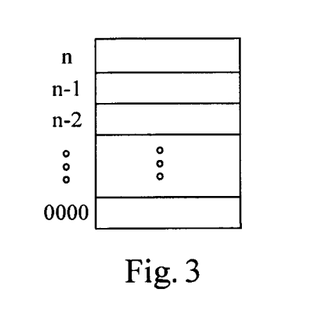
FIG. 3 is a schematic view showing a way of storing the structure variable information in a data storage area according to one embodiment.

For example, referring to FIG. 3, the structure variable information of the switched display image is stored in the storage space corresponding to the address of n, and the structure variable information of a display image before the switch is stored in the storage space corresponding to the address of n−1. If the system identifies that the switch is implemented via the cancel key, then it can display the image corresponding to the structure variable which is stored in the storage space corresponding to the address of n−1. Wherein, the structure variable information of a currently displayed image on the TV set is always stored in the storage space referred by the address of n. When a new image is displayed, the structure variable information of previously displayed image is stored in the storage space corresponding to the address of n−1, and the structure variable information of the new image is stored in the storage space corresponding to the address of n.

According to one embodiment, by storing necessary information such as the path, channel ID and volume and so on in the inerasable data storage area of the system as the structure variable information and configuring a cancel key on the remote controller to cancel a misoperation, then when the key of "cancel" is pressed by a user, the structure variable information of the display image previous to the misoperation is invoked to restore the image information previous to the misoperation by the user, so as to return to the system state previous to the misoperation by the user, whereby the goal of correcting the misoperation is achieved.

Generally, in a TV set, display interfaces caused by misoperation events are different. Various ways to trigger the misoperation cancellation step for different instances are explained as follows.

Figure 4:
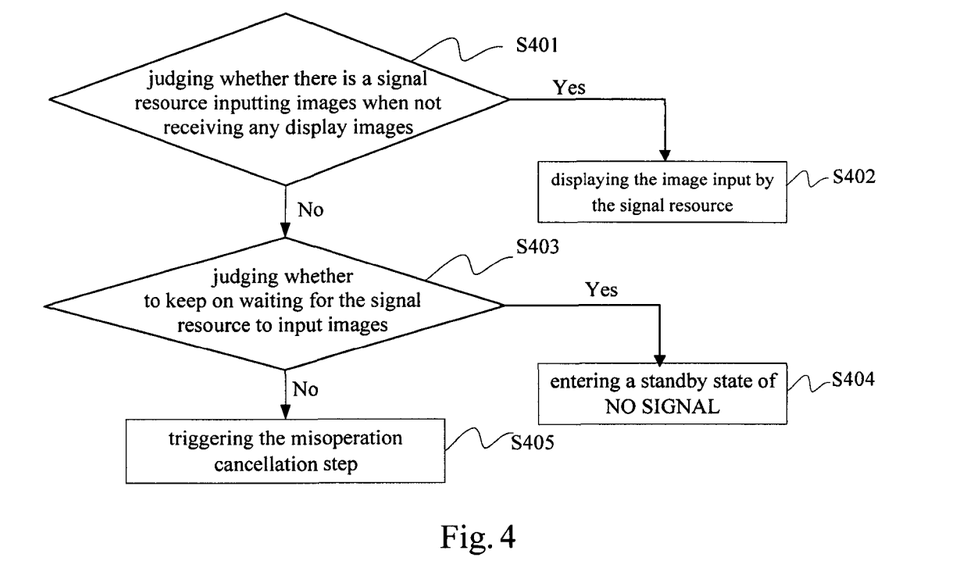
FIG. 4 is a flowchart showing a method for triggering a misoperation cancellation step according to one embodiment.

FIG. 4 shows a method, according to one embodiment, for triggering the misoperation cancellation step when an indication of "NO SIGNAL" appears on the TV set.

The method includes evaluating (S401) whether a signal resource is inputting images when having not received any display images, and if yes, performing step S402, while if otherwise, performing step S403.

Having not received any display images refers to the situation that a prompt message of "NO SIGNAL" appears when the user switches the channel.

Step S402 includes displaying the image input by the signal resource.

Step S403 includes evaluating whether to wait for the signal resource to input image, and if yes, performing step S404, while if otherwise, performing step S405.

Step S404 includes entering (S404) the standby state of NO SIGNAL.

Step S405 includes triggering (S405) the misoperation cancellation step.

In some embodiments, evaluating whether to keep on waiting for the signal resource to input the image includes outputting a prompt interface for users.

The prompt interface for users allows users to choose whether to keep on waiting for the signal resource to input images, and the method includes waiting for receiving user instructions via the prompt interface, wherein the waiting time for receiving the user instruction via the prompt interface is less than the waiting time for the standby state of NO SIGNAL. When receiving a user instruction of entering the standby state of NO SIGNAL in the period of waiting for receiving the user instruction via the prompt interface, the standby state of NO SIGNAL is entered, otherwise, the misoperation cancellation is triggered.

For example, when a user wants to play a DVD, it requires switching the signal resource channel. However, if the user is unfamiliar with the TV set, he might perform misoperation to the DVD channel while there are no DVD signal resources. The system will automatically wait for a certain period of time, and the waiting time may be configured as, for example, five to fifteen seconds. During the system waiting time, an image input by a signal resource is played when the signal resource is detected. Otherwise, the TV set will pop up a display interface for prompting the user to decide whether to keep on waiting for the input of the signal resource when no signal resources are detected, wherein the time for waiting for receiving the user instruction via the prompt interface may be fifteen to thirty seconds. Of course, the time period may be longer or shorter.

When not receiving the information of display image, the user is prompted by configuring a prompt interface, enabling the user having time to choose and judge whether there is a misoperation.

Figure 5:
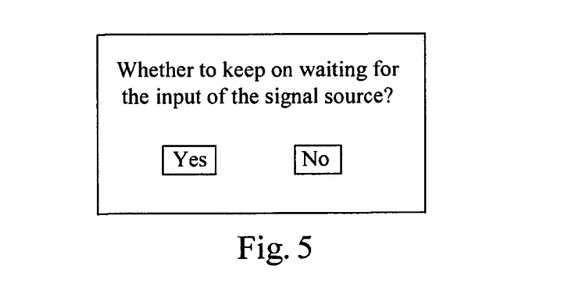
FIG. 5 is a schematic view showing a prompt interface according to one embodiment.

The content displayed in the prompt interface, according to one embodiment, as shown in FIG. 5, is "whether to keep on waiting for the input of signal resources", and configuring YES or NO for the user to choose. It should be understood that, the content of prompt interface is not limited to the exemplary example provided in FIG. 5. Other forms of prompt interface may be employed to provide the interface for user to choose. Any interface which provides function for the user to choose may be used n.

When the user chooses YES, a standby program of NO SIGNAL is invoked and a standby interface of NO Signals is presented. The misoperation cancellation step is triggered if the user chooses NO. The structure variable information from before the switch is stored in the inerasable data storage area, based on which the TV set may display the image corresponding to the structure variable information, so as to quickly cancel the misoperation.

Figure 6:
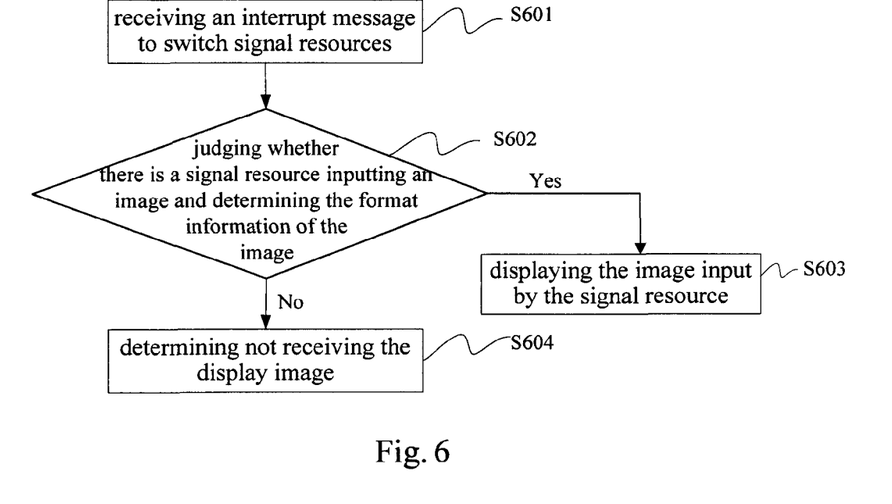
FIG. 6 is a flowchart showing another method for triggering a misoperation cancellation step according to one embodiment.

Referring to FIG. 6, according to one embodiment, before not receiving the display image, the method further includes the following.

Receiving (S601) an interrupt message to switch signal resources. Receiving the interrupt message to switch signal resources refers to the TV set receiving the instruction message from the user to switch the signal resource. For example, when a user wants to play a DVD, he/she presses a button to trigger and switch the signal resource channel.

Evaluating whether there is a signal resource inputting an image and determining the format information of the image, and if yes, performing step S603, while if otherwise, performing step S604.

The TV set will detect the input signal and determine the format of the signal when receiving an interrupt message, that is to say, the TV set detects whether there is a signal resource to input an image and detect the format information of the image. The format information includes image resolution, image format and so on.

Displaying (S603) the image input by the signal resource.

When the TV set detects an input from a signal resource, for example when a DVD signal is input, the TV set will display the image provided by the signal resource.

Determining (S604) that the display image is not received.

The TV set will present a picture of NO SIGNAL when it does not detect any signal resources. Of course, it requires performing the steps shown in FIG. 4 to trigger the misoperation cancellation step when the picture of NO SIGNAL appears.

In summary, when the TV set presents the indication of NO SIGNAL, by popping up a prompt interface, a user may be prompted whether to keep on waiting for the input of signal resources. And, the user may choose to keep on waiting for the input of signal resources or to restore to the image presented before the misoperation, so as to prevent the user from waiting for the standby program of NO SIGNAL for a long time. Further it may contribute to cancelling the misoperation by the users who are unfamiliar with employ of the TV set as quickly as possible and quickly switching to the image presented before the misoperation.

In the case the TV set keeps on displaying images, for example, when a user enters a picture of the TV set researching for channels by a misoperation, or a user switches to another interface accidentally when adjusting picture parameters of a TV set, and so on, the following misoperation cancellation procedure occurs in some embodiments.

A misoperation cancellation step is triggered when receiving a display image and a user instruction of triggering misoperation cancellation.

According to one embodiment, receiving a user instruction of triggering the misoperation cancellation is implemented by configuring a cancel key. When the TV set is displaying images and receives an indications that the user has triggered the cancel key, it determines to trigger the misoperation cancellation step, that is, invoke the structure variable information of the display image before the misoperation is triggered which is stored in a inerasable data storage area, and displays the image corresponding to the structure variable information.

It should be understood that whether or not triggering the misoperation event is judged by configuring the key of "cancel", it might be implemented by other key but not only the key of "cancel". According to this, no limit is made as to the key which triggers the misoperation cancellation.

The misoperation processing method which is described herein for the misoperation in the TV set may be applied to other displays or display systems, according to which, no limit is made as to the application of the misoperation processing method described herein.

In summary, firstly storing necessary information such as the path, channel ID and volume of the currently displayed image and so on as the structure variable information in the inerasable data storage area in stack and configuring the cancel key to facilitate the user to choose to implement of cancelling the misoperation; then displaying the image corresponding to the structure variable information that was stored before the misoperation, which is stored in the inerasable data storage area, when receiving a trigger message generated by the user pressing the cancel key, or popping up a prompt interface for the user to choose whether to keep on waiting for the input of the signal resource if not receiving the display image. If it is not required to wait, then invoking the structure variable information before the misoperation, which is stored in the inerasable data storage area, and displaying the image corresponding to the structure variable information so as to cancel the misoperation quickly.

Figure 7:
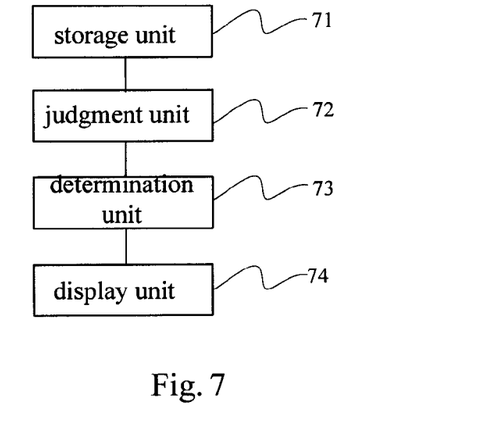
FIG. 7 is a structure schematic view showing a misoperation processing apparatus according to one embodiment.

Referring to FIG. 7, a misoperation processing apparatus according to an embodiment includes the following. A storage unit 71 is configured for pre-storing display status information of a display device in a data storage area. A judgment unit 72 is configured for evaluating whether to trigger a misoperation cancellation step. A determination unit 73 is configured for determining, in response to the triggering of the misoperation cancellation step, the display status information of the display device that was pre-stored in the data storage area of the display device before the misoperation. A display unit 74 is for restoring the display status of the display device based on the pre-stored display status information of the display device.

The misoperation processing apparatus described herein is configured for firstly pre-storing the display status information of a display device in the data storage area, and when a user triggers a misoperation cancellation, restoring the display status of the display device based on the display status information of the display device pre-stored in the data storage area of the display device before the misoperation event occurs, whereby quickly cancelling the misoperation event and restoring the display device to the display status before the misoperation during image display.

In some embodiments, the display status information of the display device includes structure variable information of a display image on the display device.

In some embodiments, the structure variable information includes the path, channel and volume of the display image.

In some embodiments, the structure variable information of the display image pre-stored in the data storage area by the storage unit 71 is stored in an inerasable data storage area in stack.

In some embodiments, the determination unit 73 for determining the display status information of a display device pre-stored in a data storage area of the display device before the misoperation occurs, is configured for determining the structure variable information of the display image based on an address pointer of the structure variable of the display image which is stored in the inerasable data storage area before the misoperation occurs.

In some embodiments, the judgment unit 72 is configured for evaluating whether a signal resource has input an image when not receiving any display image, and if yes, then displaying the image input by the signal resource, while if otherwise, evaluating whether to keep on waiting for the signal resource to input the image. In response to determining to wait, the judgment unit 72 is configured for entering a standby state of NO SIGNAL, and in response to determining not to wait, the judgment unit is configured for triggering the misoperation cancellation step.

In some embodiments, the judgment unit 72 for evaluating whether to keep on waiting for the signal resource to input the image is further configured for outputting a prompt interface for users to choose whether to keep on waiting for the signal resource to input the image, and waiting for receiving a user instruction through the prompt interface, wherein waiting time for receiving the user instruction through the prompt interface is less than that for the standby state of NO SIGNAL.

In response to receiving the user instruction of entering the standby state of NO SIGNAL in the period of waiting for receiving the user instruction through the prompt interface, the standby state of NO SIGNAL is entered, otherwise, the misoperation cancellation is triggered.

In some embodiments, before the judgment unit 72 is not receiving the display image, the apparatus is configured for receiving an interrupt message to switch signal resources, and for evaluating whether there is a signal resource inputting an image and determining the format information of the image, and if yes, displaying the image input by the signal resource, while if not, determining that the display image is not received.

In some embodiments, the judgment unit 72 is further used for the following additional function.

When receiving the display image and the user instruction of triggering misoperation cancellation, the judgment unit 72 triggers the misoperation cancellation.

In one embodiment, a display device includes a misoperation processing apparatus according to the embodiments described herein.

In conclusion, the embodiments described herein relate to a processing method for misoperation including: storing necessary information such as the path, channel ID and volume and so on of the currently display image in the inerasable data storage area in stack as the structure variable information; and configuring a cancel key to enable the user to choose cancelling the misoperation; when receiving a trigger message generated by the user pressing the cancel key, displaying the image corresponding to the structure variable information before the misoperation, wherein the structure variable information is stored in the inerasable data storage area; when not receiving any display images, popping up a prompt interface for the user to choose whether to keep on waiting for input of the signal resource, and in response to a decision not to wait, then invoking the structure variable information pre-stored before the misoperation in the inerasable data storage area, and displaying the image corresponding to the structure variable information, whereby quickly cancelling the misoperation and restoring the display state of the display device to the state before the misoperation.

It is appreciated that the above embodiments are merely illustrative embodiments employed for illustrating the principles described herein, and the present disclosure is not limited thereto. Various variations and improvements may be made by those skilled in the art without departing from the spirit and essence of the embodiments described herein, and such variations and improvements are also considered as within the scope of the present disclosure.

This written description uses examples to illustrate the disclosure, including the best mode, and also to enable any person skilled in the art to practice the embodiments described herein, including making and using any devices or systems and performing any incorporated methods. Other possible embodiments are intended to be within the scope of the claims if they have elements that do not differ from the literal language of the claims, or if they include equivalent elements with insubstantial differences from the literal languages of the claims.

What is claimed is:

1. A misoperation processing method comprising:
determining, in response to triggering a misoperation cancellation, display status information of a display device, the display status information stored in a data storage area of the display device before the misoperation occurs; and
restoring a display status of the display device that existed before the misoperation occurred based on the determined display status information;
wherein, triggering the misoperation cancellation comprises:
evaluating whether there is an image input by a signal resource when not receiving any display image;
displaying the image input by the signal resource in response to determining that the image input is present;
evaluating, in response to determining that the image input is not present, whether to wait for the signal resource to input an image;
entering a standby state of NO SIGNAL in response to determining to wait for the signal resource; and
triggering the misoperation cancellation in response to determining not to wait for the signal resource.

2. The method according to claim 1, wherein the display status information of the display device includes structure variable information of a display image on the display device.

3. The method according to claim 2, wherein the structure variable information includes a path, a channel and a volume of the display image.

4. The method according to claim 3, further comprising storing the structure variable information of the display image as pre-stored information in an inerasable data storage area in a stack of the data storage area of the display device before the misoperation occurs.

5. The method according to claim 4, wherein, determining the display status information of the display device before the misoperation occurs comprises:
determining the structure variable information of the display image based on an address pointer of the structure variable information of the display image stored in the inerasable data storage area before the misoperation occurs.

6. The method according to claim 1, wherein, evaluating whether to wait for the signal resource to input the image, further comprises:
outputting a prompt interface for a user to choose whether to wait for the signal resource to input an image, and waiting for receiving a user instruction through the prompt interface, wherein a waiting time for receiving the user instruction through the prompt interface is less than a waiting time for the standby state of NO SIGNAL; and
entering the standby state of NO SIGNAL if the user instruction for entering the standby state of NO SIGNAL is received in the period of waiting for receiving user instruction through the prompt interface, otherwise, triggering the misoperation cancellation.

7. The method according to claim 1, further comprising:
receiving an interrupt message to switch signal resources;
evaluating whether there is a signal resource inputting an image;
determining format information of the image and displaying the image input by the signal resource in response to determining that the signal resource is inputting an image; and
determining that no display image is being received in response to determining that the signal resource is not inputting an image.

8. The method according to claim 1, wherein triggering the misoperation comprises: receiving a display image and a user instruction of triggering the misoperation cancellation, and triggering the misoperation cancellation.

9. A misoperation processing apparatus comprising:
a storage unit for pre-storing display status information of a display device in a data storage area before a misoperation occurs;
a judgment unit for evaluating whether to trigger a misoperation cancellation;
a determination unit for determining, in response to triggering the misoperation cancellation, the display status information of the display device pre-stored in the data storage area of the display device; and
a display unit for restoring the display status of the display device based on the display status information pre-stored in the data storage area,
wherein the display status information of the display device comprises structure variable information of a display image on the display device,
wherein the judgment unit is configured to evaluate whether there is a signal resource inputting an image when not receiving any display image, to display the image input by the signal resource in response to determining that the signal resource is inputting the image, to evaluate whether to wait for the signal resource to input the image in response to determining that the signal resource is not inputting the image, to enter a standby state of NO SIGNAL in response to determining to wait for the signal resource, and to trigger the misoperation cancellation in response to determining not to wait for the signal resource.

10. The apparatus according to claim 9, wherein the structure variable information comprises a path, a channel and a volume of the display image.

11. The apparatus according to claim 10, wherein the structure variable information of the display image pre-stored in the data storage area is stored in an inerasable data storage area in a stack.

12. The apparatus according to claim 11, wherein, the determination unit is configured to determine the structure variable information of the display image based on an address pointer of the structure variable of the display image pre-stored in the inerasable data storage area before the misoperation occurs.

13. The apparatus according to claim 9, wherein the judgment unit is further configured to output a prompt interface for a user to choose whether to wait for the signal resource to input the image, and to wait for receiving a user instruction through the prompt interface, wherein a waiting time for receiving the user instruction through the prompt interface is less than a waiting time for the standby state of NO SIGNAL;
wherein the judgment unit is configured to, in response to receiving the user instruction of entering the standby state of NO SIGNAL in the period of waiting for receiving the user instruction through the prompt interface, enter the standby state of NO SIGNAL; and
wherein the judgment unit is configured to trigger the misoperation cancellation after the period of waiting for receiving the user instruction expires without the judgment unit having received the user instruction.

14. The apparatus according to claim 9, wherein the judgment unit is configured to:

receive an interrupt message to switch signal resources; and evaluate whether there is a signal resource inputting an image, determine format information of the image and display the image input by the signal resource in response to determining that the signal resource is inputting the image, and to determine that the display image is not received in response to determining that the signal resource is not inputting the image.

15. The apparatus according to claim 9, wherein, the judgment unit is configured to, in response to receiving a display image and a user instruction of triggering misoperation cancellation trigger the misoperation cancellation.

16. A display device comprising the apparatus according to claim 9.

17. A display device comprising the apparatus according to claim 15.

* * * * *